United States Patent [19]
Hunter

[11] Patent Number: 5,862,266
[45] Date of Patent: Jan. 19, 1999

[54] CIRCUIT FOR SHARPENING OF EDGES OF A PIXEL IMAGE IN A COLOR COPIER

[75] Inventor: Paul E. Hunter, San Diego, Calif.

[73] Assignee: Hewlett-Packard Company, Palo Alto, Calif.

[21] Appl. No.: 659,814

[22] Filed: Jun. 7, 1996

[51] Int. Cl.⁶ ....................................................... G06K 9/40
[52] U.S. Cl. ........................... 382/266; 382/254; 382/205
[58] Field of Search ..................................... 382/254, 260, 382/263, 266, 205; 358/517, 532; 364/724.12

[56] References Cited

U.S. PATENT DOCUMENTS 5,163,100  11/1992  Mathieu et al. .................... 364/724.12
5,668,895   9/1997  Yamazaki et al. ...................... 382/260

Primary Examiner—Thomas D. Lee

[57] ABSTRACT

A circuit for sharpening a pixel image includes M accumulators which provide a rolling sum for each of a sequence of image pixel values. Each rolling sum comprises the sum of pixel values in the accumulator, all pixel values resident in the M accumulators comprising an array of pixel values, with one such accumulator including a central array pixel value. M inputs apply a sequence of at least N image pixel values to each of the M accumulators. Each sequence of N image pixel values is logically arrayed along a first dimension of the image and each sequence changes as each new image pixel value is input and an oldest image pixel value is removed. Each time a new image pixel is input to an accumulator, the accumulator outputs a new rolling sum of the image pixel values present therein. An arithmetic circuit determines from each set of M rolling sums, an average pixel value of the array of image pixel values, and then derives a difference between the central image pixel value and the average image pixel value. This arithmetic action arrives at a filtered central image pixel value which is substituted for the central image pixel value, thereby achieving a high boost filtering of the pixel image.

7 Claims, 3 Drawing Sheets

ORIGINAL MASK ("O")

LOW PASS MASK ("L")

HIGH PASS MASK ("H")

[O − L = H]

HIGH BOOST MASK ("B")

[O + H(A) = B]

CIRCUIT FOR SHARPENING OF EDGES OF A PIXEL IMAGE IN A COLOR COPIER

FIELD OF THE INVENTION

This invention relates to edge enhancement of alphanumeric characters in a color copier and, more particularly, to a circuit for applying "unsharp" masking to a pixel image so as to enhance edge definition of text characters therein.

BACKGROUND OF THE ART

Low cost color copiers are able to effectively handle the reproduction of color documents and especially, continuous tone color image data. However, due to a mixture of image scanner inaccuracies and non-linearities in color mapping, color copiers tend to cause text to be rendered with either too little or too much color. As a result, black text can be reproduced with lines that are too thin or evidence a shade of grey, rather than dark black.

The non-linearities in color mapping arise from chromatic misalignments between color planes which may, at times, be on the order of a dimension of a pixel. Such misalignment affects the sharpness of text boundary, introduces extraneous colored regions around the text and makes black discrimination more difficult. A further effect is "optical flare" which results from a combination of limited optical resolution in the copier's optics and the effects on the scanner of stray light. Optical flare can affect different print color channels disproportionately; can skew the color of the black text causing it to seem to shift towards green; and can lighten the intensity of the black text. The width of the text can also be affected.

Many image processors today use image convolution to improve image presentations. For instance, a form of image convolution is utilized when dither patterns are applied to a scaled image to improve its grey scale rendering. Image convolution, when applied to a pixel-based raster image, involves a logical superimposition of an N×M matrix window of values over an area of the image, in "alignment" with pixels of the image. The matrix window, at each position, manifests a value which is logically combined (e.g., by multiplication of the values) with an aligned image pixel, to arrive at a resultant product. The products are then added and substituted for a central image pixel within the matrix window so as to modify the central pixel in accordance with the logical operation performed using the matrix window. The matrix window is then shifted across the image so as to subject every pixel to the convolution process.

Depending upon the size of the matrix window and the number of values in the matrix window, the image convolution process can be time-consuming and processing intensive. Nevertheless, the prior art has employed image convolution in attempting to improve (or "sharpen") an image's boundaries. The basic prior art approach to such print sharpening is called "high-boost filtering". Such filtering enables the high frequency components of an image to be isolated and added back into the original image to make the edges of the original image both sharper and darker. More specifically, the prior art has subjected a pixel image to an initial low-pass filtering action to derive a "blurred" version of the original image. That blurred image is then subtracted from the original image to accomplish an "unsharp" masking. This action identifies the high frequency components of the original image.

More specifically, since an image is represented by discrete pixel values, the term "frequency" refers to the spatial frequencies in "cycles per pixel" units. As in one dimensional signal processing, pixel edge transitions have many frequency components and image regions which show large rates of intensity change have many high-frequency components. Hence, if areas of an image can be identified which exhibit high frequency components, those portions of the image can be sharpened by "high frequency boosting" through the alteration of the pixels where the high frequency components reside.

Even though the concept of high boost filtering to enhance image edges is known; the use of matrix windows, the shifting thereof across high-definition pixel images of (e.g. 300–600 dpi), and the resultant processing of the results are computationally intensive and time-consuming.

Accordingly, it is an object of this invention to provide improved apparatus for high boost filtering of a pixel image so as to enhance image edges.

It is another object of this invention to provide a circuit which implements a high-boost filtering procedure, wherein matrix calculations are minimized.

SUMMARY OF THE INVENTION

A circuit for sharpening a pixel image includes M accumulators which provide a rolling sum for each of a sequence of image pixel values. Each rolling sum comprises the sum of pixel values in the accumulator, all pixel values resident in the M accumulators comprising an array of pixel values, with one such accumulator including a central array pixel value. M inputs apply a sequence of at least N image pixel values to each of the M accumulators. Each sequence of N image pixel values is logically arrayed along a first dimension of the image and each sequence changes as each new image pixel value is input and an oldest image pixel value is removed. Each time a new image pixel is input to an accumulator, the accumulator outputs a new rolling sum of the image pixel values present therein. An arithmetic circuit determines from each set of M rolling sums, an average pixel value of the array of image pixel values, and then derives a difference between the central image pixel value and the average image pixel value. This arithmetic action arrives at a filtered central image pixel value which is substituted for the central image pixel value, thereby achieving a high boost filtering of the pixel image.

DETAILED DESCRIPTION OF THE INVENTION

Figure 6:
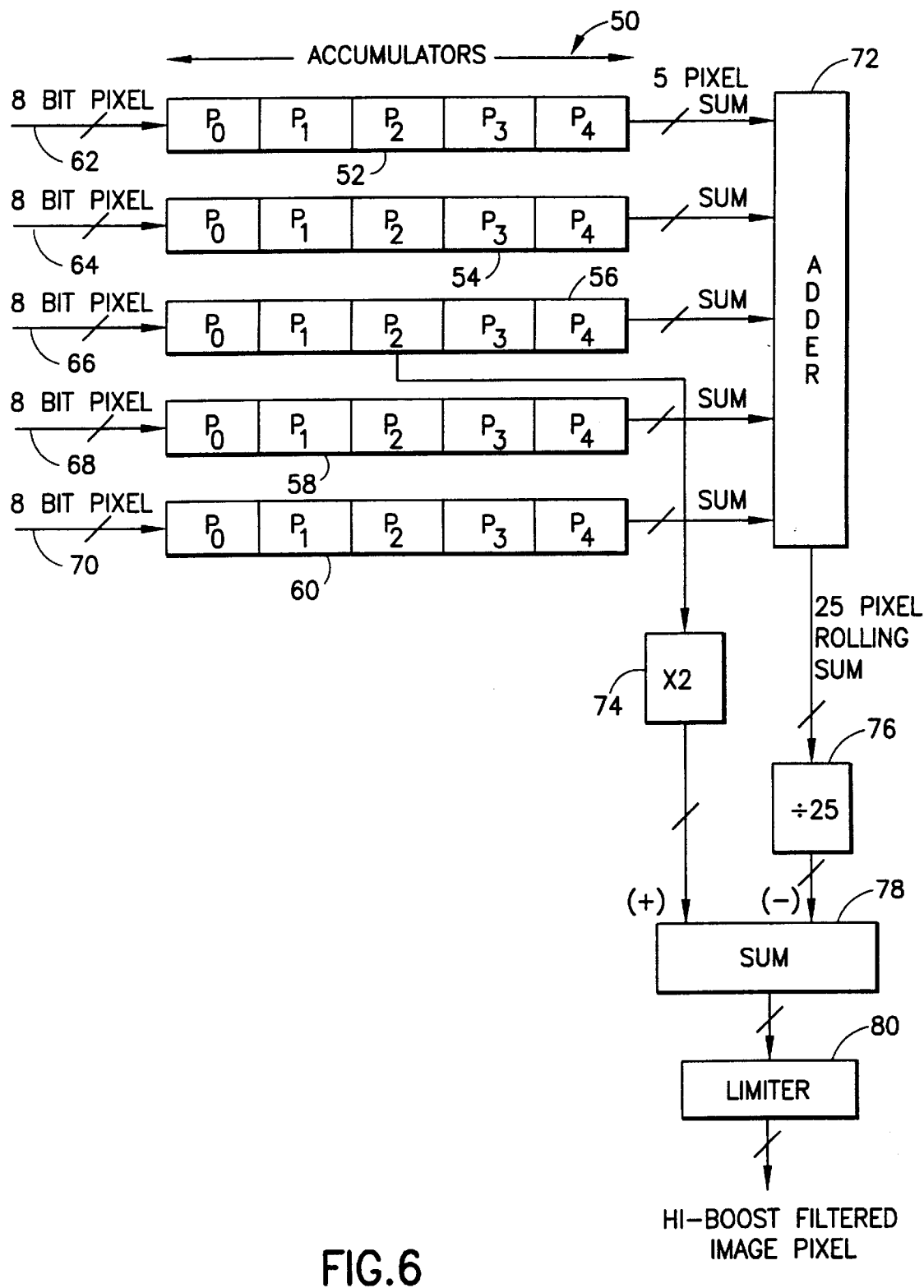
FIG. 6 is a block diagram of a circuit embodying the high frequency boost filtering invention hereof.

Before turning to a block diagram of the circuit which embodies the invention hereof (as shown in FIG. 6), it is worthwhile to consider the derivation of the high-boost filter mask which is implemented by the circuit.

As described above, a high-boost filtering action is created by deriving a blurred image of an original pixel image; subtracting the blurred image from the original pixel image to isolate high-frequency portions thereof; and adding a percentage of the isolated high-frequency image portions back to the original image. To achieve this action, it has been determined that a 5×5 matrix window of filter values is preferable.

In the representations of the filter masks shown in FIGS. 1–4, each mask comprises a 5×5 array of filter values which are multiplied against logically "underlying" image pixels, as the filter mask is shifted across the pixel image, one pixel row at a time.

Figure 1:
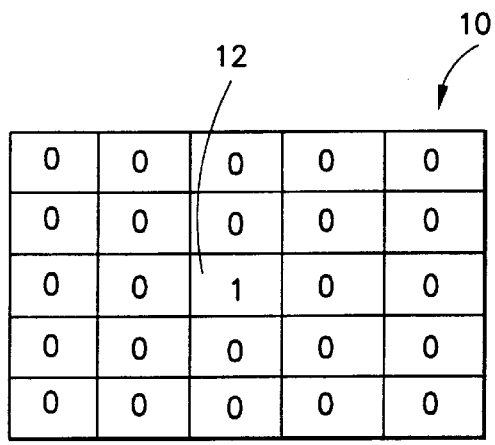
FIG. 1 is a schematic representation of an original filter mask that enables reproduction of an original image.

Referring to FIG. 1, an "original" filter mask 10 (mask 0) is shown, which, when logically overlaid onto an image pixel array, results in no change of the original pixel image. Thus, the product of each filter value that is equal to "0" and the logically aligned image pixel value is a "0". Only when central pixel 12 is multiplied by a logically aligned pixel value does the actual pixel value result. Then, when all of the products are summed, the filter action results in an output of the original image pixel that is aligned with filter value 12. If that value is then substituted back into the original pixel image, there is, of course, no change in the original pixel image.

Figure 2:
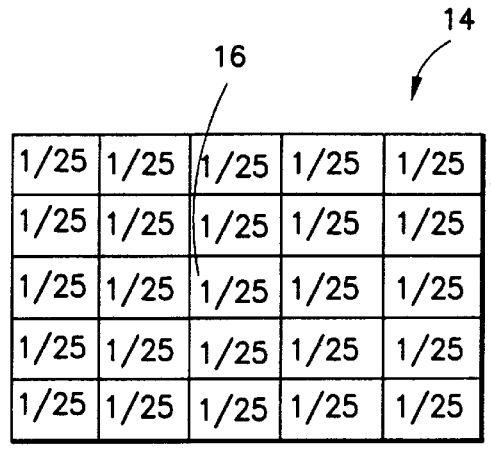
FIG. 2 is a schematic representation of a filter mask which provides a low pass filtering of an image.

FIG. 2 represents a low-pass filter mask 14 (mask L) wherein the coefficients are chosen to have an identical value (e.g., $\frac{1}{25}$). In essence, low pass filter mask 14, when combined with logically aligned image pixels, results in a blurring of the image. The application of low-pass filter mask 14 to an underlying image results in an overall blurring of the image due to the fact that small percentages of all 5×5 surrounding pixels are derived and added together to become a substitute central pixel 16.

Figure 3:
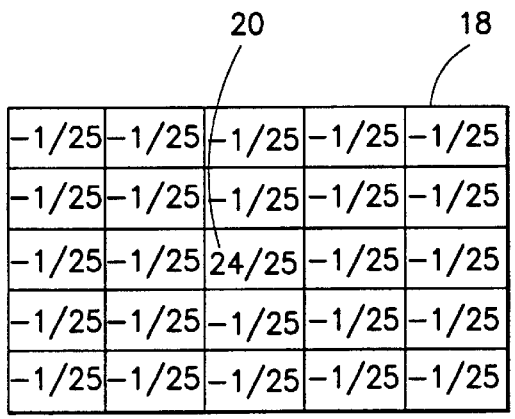
FIG. 3 is schematic representation of a high pass filter mask which is the result of subtraction of the low-pass filter mask of FIG. 2 from the original filter mask of FIG. 1.

To derive a high-pass filter mask 18 (mask H), shown in FIG. 3, the coefficient values of low-pass filter mask 14 are subtracted from the coefficient values of original image mask 10. The resultant summation is shown in high-pass filter mask 18, wherein all coefficients therein, save central pixel 20, are the same (i.e., $-\frac{1}{25}$). Central pixel 20 exhibits a coefficient value of $\frac{24}{25}$.

It can be seen that substantial processing benefits are gained by utilizing, in low pass filter mask 14, identical coefficient values—as only 2 calculations are required to derive high pass filter mask 18. Were a Gaussian or other low-pass filter function employed, each of the coefficients in low-pass filter mask 14 would be different and would require an independent calculation. When it is considered that low pass filter mask 14 is to be shifted across an entire image, comprising millions of pixels, it can be understood that the calculation reduction results in a substantial savings of processing time.

While high-pass filter mask 18 enables the isolation of high-frequency components of an underlying pixel image, to provide the "high boost" filter function requires that the result of the high pass filtering action be added to the original image. This can be achieved by adding high pass filter mask 18 and original filter mask 10, to arrive at high boost filter mask 22 (mask B). Then, when high boost filter mask 22 is shifted across a pixel image, it will result in an enhancement of the high frequency regions of the original image, as a result of the addition of high frequency components isolated from the blurred image.

In order to further reduce the complexity of the computations involved in the aforesaid actions, the full coefficient values of high pass filter mask 18 are added to original filter mask 10 (rather than reducing the values thereof by some fraction). More specifically, a multiplier "A" equal to 1 is chosen.

Figure 5:
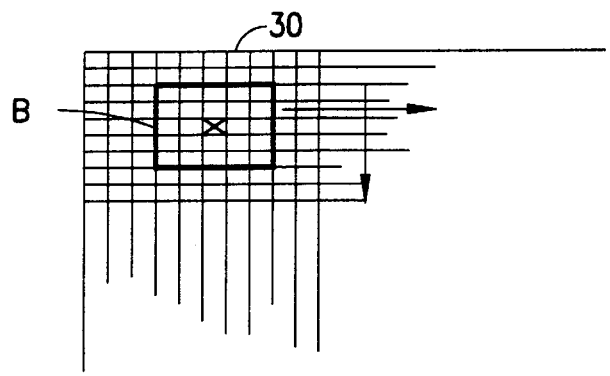
FIG. 5 is a schematic representation illustrating how a filter mask is shifted across a pixel image representation.

FIG. 5 shows schematically how high boost filter mask B is stepped, first horizontally across a swath of pixel values in a pixel image 30, one pixel column at a time, followed by being shifted down one pixel row and then re-shifted across a new swath of pixels. At each new location of high boost filter mask B, the filter function is performed and resulting value is stored for later substitution for the underlying image pixel (marked "X"). The substitution action occurs after all rows have been examined—to avoid incorrect results which would occur if the substitution took place while adjacent rows were being subjected to the filter action.

As will be hereinafter understood, it has been determined that the high boost filter action illustrated by high boost filter mask 22 can be accomplished in an efficient and rapid manner through the use of the circuit shown in FIG. 6. Note that high boost filter mask 22 is the result of the subtraction of low pass filter mask 14 from original filter mask 10. This can be expressed as:

mask H=mask O−mask L similarly:

mask B=mask O+mask H.

The above relationship can be re-written as:

mask B=mask O+(mask O−mask L).

mask B=2 mask O−mask L          (1)

The circuit of FIG. 6 implements expression 1 by applying high boost mask 22 (mask B) to an input pixel image.

Figure 4:
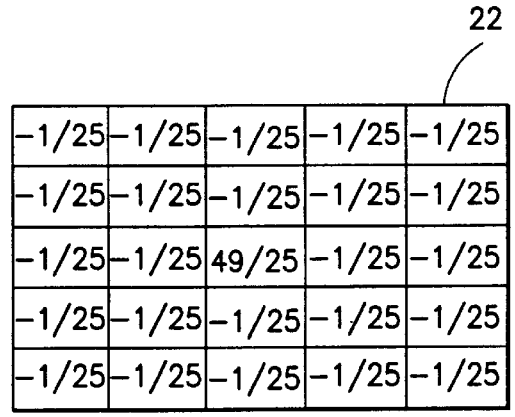
FIG. 4 is a schematic representation of a high-boost filter mask which results from an addition of the original mask of FIG. 1 and the high-pass filter mask of FIG. 3.

Referring to FIG. 6, a high boost filter circuit 50 implements high boost mask 22 of FIG. 4 and comprises a plurality of accumulators 52, 54, 56, 58 and 60. Each accumulator includes plural delay stages P0, P1, P2, P3 and P4, each delay stage holding an 8-bit image pixel value. Image pixel values are input from a random access memory (not shown) which includes plural color planes, each color plane comprising a raster structure of pixel color values.

As indicated with respect to FIG. 5, a controlling processor (not shown) causes a read out of 8-bit color pixel values from a raster image memory, via input lines 62, 64, 66, 68 and 70 to a respectively connected accumulator. As an 8-bit pixel value is inserted into the P0 delay stage of an accumulator, the P4 pixel value is removed and dumped. Upon entry of a new 8-bit pixel value into a P0 delay stage, the respective accumulator provides an output value which is equal to the sum of the five current pixel values resident therein. Those sums are provided to an adder 72 which provides a "rolling" sum output of the 25 pixel values currently resident in accumulators 52, 54, 56, 58 and 60. As each new pixel value is inserted into an accumulator, the rolling sum output of adder 72 changes to indicate the current sum of the pixels resident in the accumulators.

As each new pixel is entered into the respective accumulators, an 8-bit value from pixel module P2 (in accumulator 56) is read out to a ×2 multiplier 74, which provides a doubling of the 8-bit value.

The rolling sum output of adder 72, in each cycle, is applied to a divider 76 which provides an output that is the average of all of the current pixel values in accumulators 52, 54, 56, 58 and 60. That average pixel value is applied as a negative input to a summing circuit 78. The output of ×2 multiplier 74 is applied as a positive input to summing circuit 74.

The resultant output from summing circuit 78 is the difference between the central pixel value P2 in accumulator 56 and the average value of the pixels which contribute to the rolling sum output from adder 72. From a review of equation 1 above, it can be seen that the output of summing circuit 78 is a value which represents a high boost filtered pixel value which can be later substituted for the image pixel which corresponds, in logical position, to central pixel P2 in accumulator 56. Before the substitution is made, however, the pixel value is passed through a limiter 80 which restricts its value to a range of 0–255. Limiter 80 avoids the effects of "ringing" which may create values greater than 255 or less than 0 (i.e. negative values).

Figure 7:
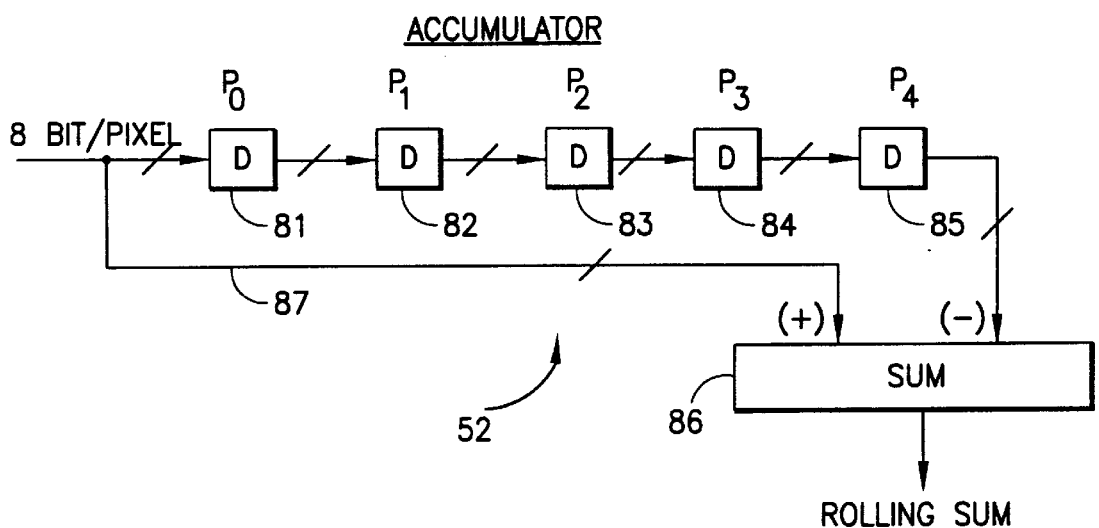
FIG. 7 is a block diagram illustrating further details of an accumulator block shown in FIG. 6.

FIG. 7 shows a more detailed block diagram of an accumulator (e.g. accumulator 52). Each accumulator includes five delay stages 81–85 which store a sequence of input pixel values P0–P4. The output of delay element 85 is fed as a negative input to a summing circuit 86 which, in turn, receives, as a positive input, each new 8-bit pixel value entered via line 87. Thus, as each new 8-bit pixel value is clocked into delay stage 81, the oldest pixel value (in delay stage 85) is clocked into summing register 86 as a negative quantity. That negative quantity is subtracted from the newly entered 8-bit pixel value, causing a rolling sum (which has been accumulated in sum circuit 86) to then represent the sum of current pixels P0–P4.

As will be apparent to those skilled in the art, certain well known elements have been omitted from FIGS. 6 and 7. For instance, the processor which controls the clocking of data through the circuits of FIGS. 6 and 7, and its connections have been omitted to avoid over complicating the view. Further, the operations of division circuit 76 are accomplished using a plurality of adders and shift actions to enable the division by 25. It will often be the case that division by 25 will cause an output which includes a fractional decimal value. That decimal value may be omitted.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A circuit for sharpening a pixel image comprising:

M accumulator means (M being an integer>1), each for providing a rolling sum of a sequence of current image pixel values resident therein, all said current image pixel values resident in said M accumulator means comprising an array of image pixel values, one said accumulator including a central image pixel value in said array;

M input means for inputting a sequence of at least N image pixel values (N being an integer>1) to each of said M accumulator means, each sequence of N image pixel values logically arrayed along a first dimension of said image, each sequence of current image pixel values changing as each new image pixel value is input and an oldest image pixel value is removed, each said sequence of current image pixel values enabling said M accumulator means to output a new set of M rolling sums;

arithmetic means coupled to said M accumulator means for determining from each set of M rolling sums, an average pixel value of said array of pixel values; and summing means for deriving a difference between twice said central pixel value and said average pixel value, so as to arrive at a filtered central pixel value to be substituted for said central pixel value in said pixel image.

2. The circuit as recited in claim 1, wherein N=M.

3. The circuit as recited in claim 2, wherein N=M=5.

4. The circuit as recited in claim 1, wherein each accumulator means comprises:

N delay stages for holding said sequence of N image pixel values; and difference means coupled to an Nth delay stage which holds an oldest image pixel value of a sequence of image pixel values input to said N delay modules, and to an input which receives a newest image pixel value which alters said sequence, for subtracting said oldest image pixel value from a sum of current pixel values held in said N delay modules to derive a new rolling sum.

5. The circuit as recited in claim 1, wherein said summing means includes limiter means for limiting said filtered central image pixel value to a predetermined range of pixel values.

6. The circuit as recited in claim 1, wherein said first dimension of said pixel image is arrayed along a scan row of said pixel image and said M input means input image pixel values from M contiguous rows of said pixel image.

7. The circuit as recited in claim 6, wherein said M input means are controlled to input sets of M image pixel values to said M accumulator means until all image pixels along M rows have been input, at which point, said M input means input a further set of M image pixel values, offset from a previous set by one scan row, and continue the aforesaid action until all rows of a pixel image have been input to said N accumulator means.

* * * * *